(12) United States Patent
Ozturk et al.

(10) Patent No.: US 11,012,913 B2
(45) Date of Patent: May 18, 2021

(54) USER EQUIPMENT CAPABILITY-BASED TRANSITION

(71) Applicant: QUALCOMM Incorporated, San Diego, CA (US)

(72) Inventors: Ozcan Ozturk, San Diego, CA (US); Karthika Paladugu, San Diego, CA (US); Masato Kitazoe, Tokyo (JP); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/841,480

(22) Filed: Apr. 6, 2020

(65) Prior Publication Data

US 2020/0322866 A1 Oct. 8, 2020

Related U.S. Application Data

(60) Provisional application No. 62/830,954, filed on Apr. 8, 2019.

(51) Int. Cl.
*H04W 36/38* (2009.01)
*H04W 36/00* (2009.01)
*H04W 36/08* (2009.01)
*H04W 8/24* (2009.01)

(52) U.S. Cl.
CPC ............ *H04W 36/38* (2013.01); *H04W 8/24* (2013.01); *H04W 36/0069* (2018.08); *H04W 36/08* (2013.01)

(58) Field of Classification Search
CPC combination set(s) only.
See application file for complete search history.

(56) References Cited

U.S. PATENT DOCUMENTS

| 2017/0303182 | A1  | 10/2017 | Uchino et al. |
| 2018/0014237 | A1* | 1/2018  | Xu ............... H04W 36/0055 |
| 2018/0077624 | A1* | 3/2018  | Jung ............. H04W 8/08 |
| 2018/0220336 | A1  | 8/2018  | Hong et al. |
| 2018/0324651 | A1  | 11/2018 | Tenny et al. |
| 2019/0028940 | A1* | 1/2019  | Wu ............... H04W 36/0005 |

FOREIGN PATENT DOCUMENTS

WO WO-2018141230 A1 8/2018

OTHER PUBLICATIONS

International Search Report and Written Opinion—PCT/US2020/027034—ISA/EPO—dated Jul. 21, 2020.

(Continued)

*Primary Examiner* — Julio R Perez
(74) *Attorney, Agent, or Firm* — Harrity & Harrity, LLP / Qualcomm

(57) ABSTRACT

Various aspects of the present disclosure generally relate to wireless communication. In some aspects, a user equipment (UE) may provide, to a source base station (BS) and prior to a handover of the UE from the source BS to a target BS, information that identifies a set of transition capabilities of the UE. The UE may receive, from the source BS, a handover command or reconfiguration message after providing the information to the source BS. The UE may communicate, using a subset of the transition capabilities, with the target BS prior to the release. Numerous other aspects are provided.

36 Claims, 12 Drawing Sheets

(56) References Cited

OTHER PUBLICATIONS

Qualcomm Incorporated: "On R16 NR Mobility Enhancement," 3GPP Draft, 3GPP TSG-RAN WG4 Meeting #90, R4-1900328—Discussion R16 NR Mobility Enhancement, 3rd Generation Partnership Project (3GPP), Mobile Competence Centre, 650, Route Des Lucioles, F-06921, Sophia-Antipolis Cedex, France, vol. RAN WG4, No. Athens, Greece; Feb. 25-Mar. 1, 2019, Feb. 15, 2019 (Feb. 15, 2019), XP051605117, 7 pages, Retrieved from the internet: URL:http://www.3gpp.org/ftp/tsg%5Fran/WG4%5FRadio/TSGR4%5F90/Docs/R4%2D1900328%2Ezip [retrieved on Feb. 15, 2019], paragraphs [0001]-[0005].

* cited by examiner

USER EQUIPMENT CAPABILITY-BASED TRANSITION

CROSS-REFERENCE TO RELATED APPLICATION

This application claims priority to U.S. Provisional Patent Application No. 62/830,954, filed on Apr. 8, 2019, entitled "USER EQUIPMENT CAPABILITY-BASED TRANSITION," which is hereby expressly incorporated by reference herein.

FIELD OF THE DISCLOSURE

Aspects of the present disclosure generally relate to wireless communication, and more particularly to techniques and apparatuses for user equipment (UE) capability-based transition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include providing, to a source base station (BS) and prior to a handover of the UE from the source BS to a target BS, information that identifies a set of transition capabilities of the UE, wherein the set of transition capabilities relate to facilitating communications between the UE and the target BS prior to a release of the source BS during the handover; receiving, from the source BS, a handover command or reconfiguration message after providing the information to the source BS, wherein the handover command or reconfiguration message causes the UE to use a subset of the set of transition capabilities during the handover to facilitate the communications with the target BS prior to the release; and communicating, using the subset of the transition capabilities, with the target BS prior to the release.

In some aspects, a method of wireless communication, performed by a UE, may include providing, to a source BS operating as a master node (MN) and prior to an addition of a target BS as a secondary node (SN), information that identifies a set of transition capabilities of the UE, wherein the set of transition capabilities relate to facilitating intra-frequency communications between the UE after the addition and prior to a role switch of the target BS and the source BS or a release of the source BS; receiving, from the source BS, a radio resource control (RRC) reconfiguration message after providing the information to the source BS, wherein the RRC reconfiguration message causes the UE to use a subset of the set of transition capabilities to facilitate the intra-frequency communications after the addition and prior to the role switch or the release; and communicating, using the subset of the set of transition capabilities, with the target BS, prior to the role switch or the release.

In some aspects, a UE for wireless communication may include memory and one or more processors operatively coupled to the memory. The memory and the one or more processors may be configured to provide, to a source BS and prior to a handover of the UE from the source BS to a target BS, information that identifies a set of transition capabilities of the UE, wherein the set of transition capabilities relate to facilitating communications between the UE and the target BS prior to a release of the source BS during the handover; receive, from the source BS, a handover command or reconfiguration message after providing the information to the source BS, wherein the handover command or reconfiguration message causes the UE to use a subset of the set of transition capabilities during the handover to facilitate the communications with the target BS prior to the release; and communicate, using the subset of the transition capabilities, with the target BS prior to the release.

In some aspects, a UE for wireless communication may include memory and one or more processors operatively coupled to the memory. The memory and the one or more processors may be configured to provide, to a BS operating as an MN and prior to an addition of a target BS as an SN, information that identifies a set of transition capabilities of the UE, wherein the set of transition capabilities relate to facilitating intra-frequency communications between the UE after the addition and prior to a role switch of the target BS and the source BS or a release of the source BS; receive, from the source BS, an RRC reconfiguration message after providing the information to the source BS, wherein the RRC reconfiguration message causes the UE to use a subset of the set of transition capabilities to facilitate the intra-frequency communications after the addition and prior to the role switch or the release; and communicate, using the subset of the set of transition capabilities, with the target BS, prior to the role switch or the release.

In some aspects, a non-transitory computer-readable medium may store one or more instructions for wireless communication. The one or more instructions, when executed by one or more processors of a UE, may cause the one or more processors to: provide, to a source BS and prior to a handover of the UE from the source BS to a target BS, information that identifies a set of transition capabilities of the UE, wherein the set of transition capabilities relate to facilitating communications between the UE and the target BS prior to a release of the source BS during the handover; receive, from the source BS, a handover command or reconfiguration message after providing the information to the source BS, wherein the handover command or reconfiguration message causes the UE to use a subset of the set of transition capabilities during the handover to facilitate the communications with the target BS prior to the release; and communicate, using the subset of the transition capabilities, with the target BS prior to the release.

In some aspects, a non-transitory computer-readable medium may store one or more instructions for wireless communication. The one or more instructions, when executed by one or more processors of a UE, may cause the one or more processors to: provide, to a source BS operating as an MN and prior to an addition of a target BS as an SN, information that identifies a set of transition capabilities of the UE, wherein the set of transition capabilities relate to facilitating intra-frequency communications between the UE after the addition and prior to a role switch of the target BS and the source BS or a release of the source BS; receive, from the source BS, an RRC reconfiguration message after providing the information to the source BS, wherein the RRC reconfiguration message causes the UE to use a subset of the set of transition capabilities to facilitate the intra-frequency communications after the addition and prior to the role switch or the release; and communicate, using the subset of the set of transition capabilities, with the target BS, prior to the role switch or the release.

In some aspects, a first apparatus for wireless communication may include memory and one or more processors operatively coupled to the memory. The memory and the one or more processors may include means for providing, to a second apparatus and prior to a handover of the first apparatus from the second apparatus to a third apparatus, information that identifies a set of transition capabilities of the first apparatus, wherein the set of transition capabilities relate to facilitating communications between the first apparatus and the third apparatus prior to a release of the second apparatus during the handover; means for receiving, from the second apparatus, a handover command or reconfiguration message after providing the information to the second apparatus, wherein the handover command or reconfiguration message causes the first apparatus to use a subset of the set of transition capabilities during the handover to facilitate the communications with the third apparatus prior to the release; and means for communicating, using the subset of the transition capabilities, with the third apparatus prior to the release.

In some aspects, a first apparatus for wireless communication may include memory and one or more processors operatively coupled to the memory. The memory and the one or more processors may include means for providing, to a second apparatus operating as an MN and prior to an addition of a third apparatus as an SN, information that identifies a set of transition capabilities of the first apparatus, wherein the set of transition capabilities relate to facilitating intra-frequency communications between the first apparatus after the addition and prior to a role switch of the third apparatus and the second apparatus or a release of the second apparatus; means for receiving, from the second apparatus, an RRC reconfiguration message after providing the information to the second apparatus, wherein the RRC reconfiguration message causes the first apparatus to use a subset of the set of transition capabilities to facilitate the intra-frequency communications after the addition and prior to the role switch or the release; and means for communicating, using the subset of the set of transition capabilities, with the third apparatus, prior to the role switch or the release.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
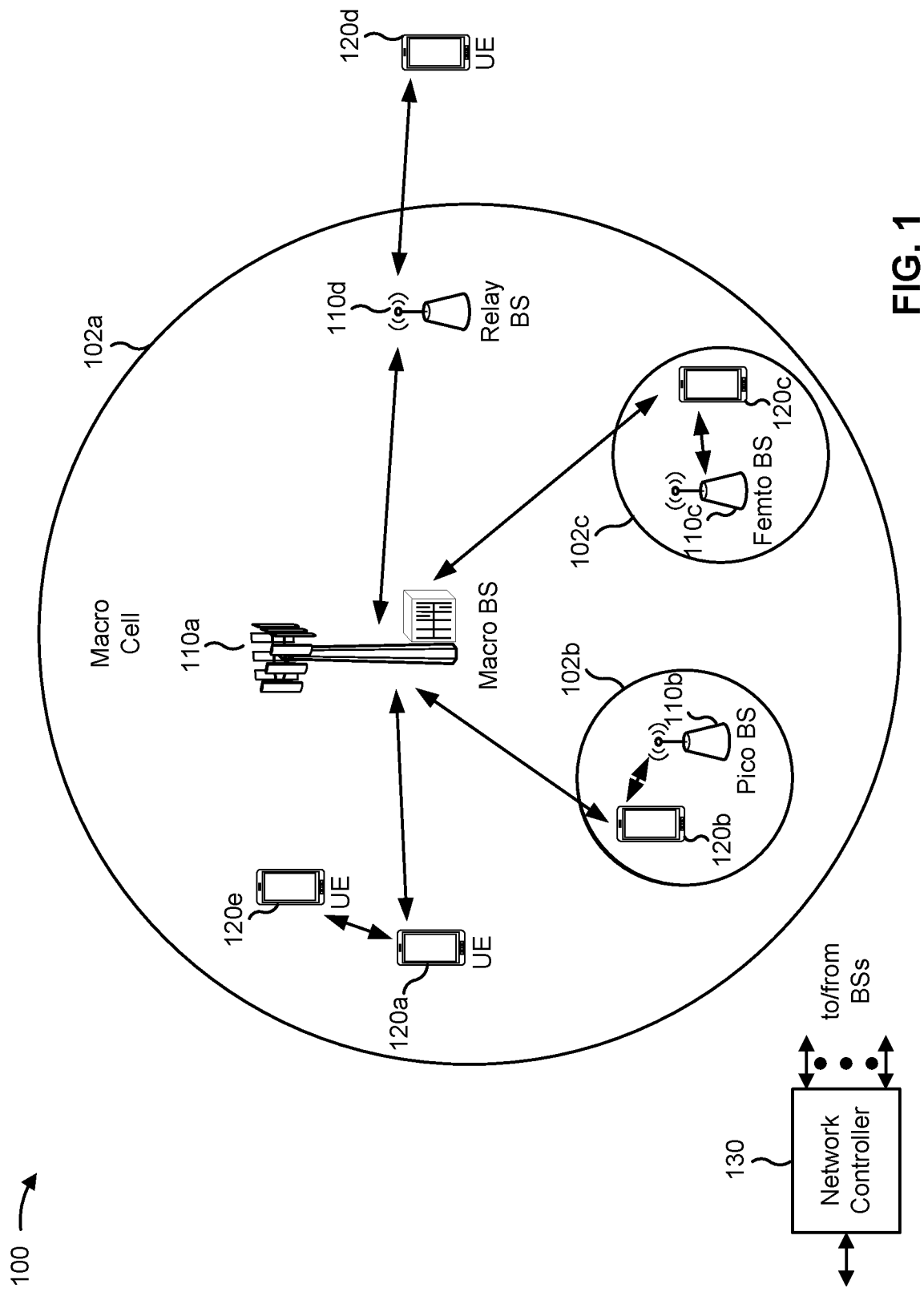
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
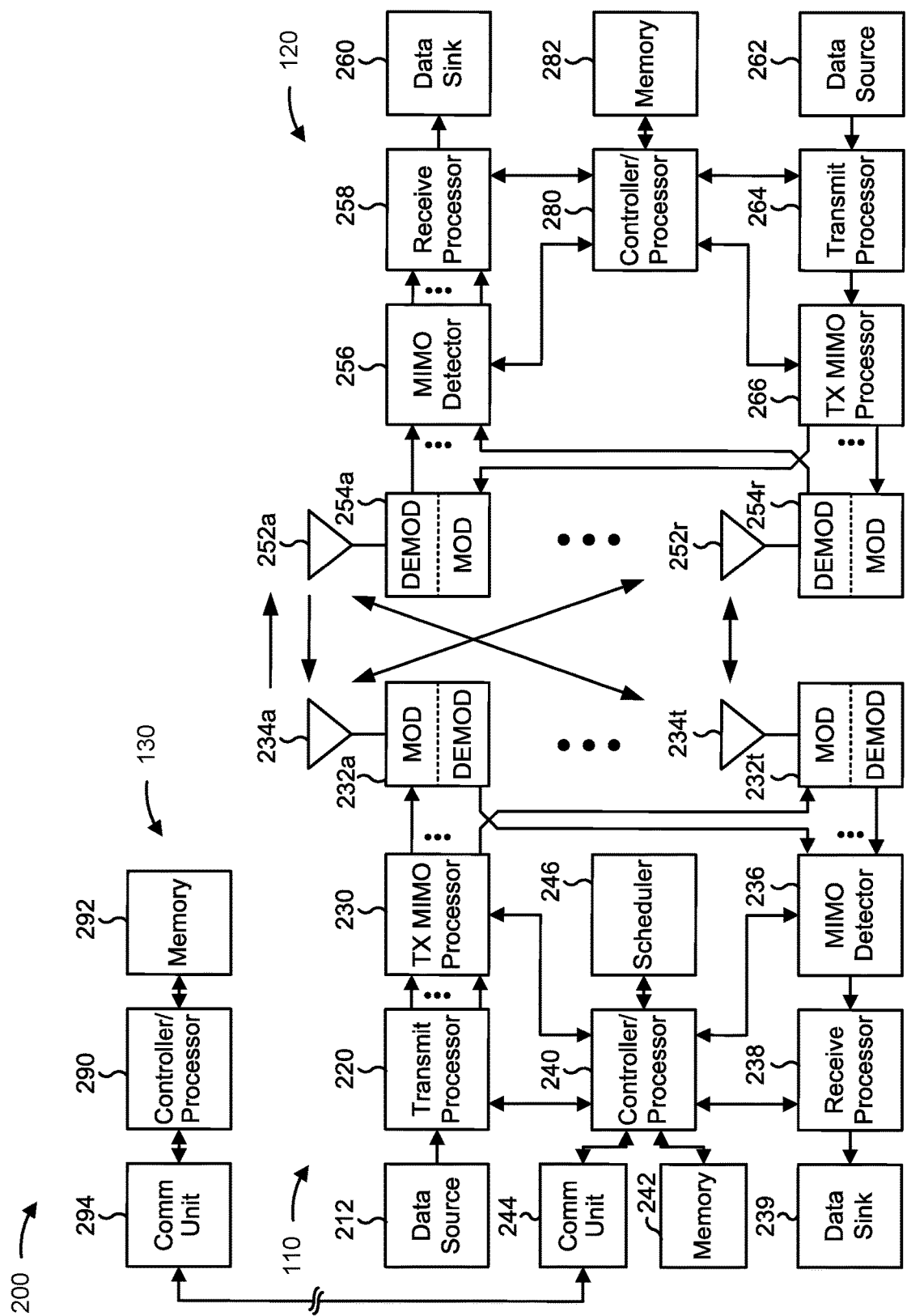
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UE capability-based transition, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for providing, to a source base station (BS) and prior to a handover of the UE from the source BS to a target BS, information that identifies a set of transition capabilities of the UE, wherein the set of transition capabilities relate to facilitating communications between the UE and the target BS prior to a release of the source BS during the handover; means for receiving, from the source BS, a handover command or reconfiguration message after providing the information to the source BS, wherein the handover command or reconfiguration message causes the UE to use a subset of the set of transition capabilities during the handover to facilitate the communications with the target BS prior to the release; means for communicating, using the subset of the transition capabilities, with the target BS prior to the release; and/or the like. In some aspects, such means may include one or more components of UE 120 described in connection with FIG. 2.

In some aspects, UE 120 may include means for providing, to a source BS operating as an MN and prior to an addition of a target BS as an SN, information that identifies a set of transition capabilities of the UE, wherein the set of transition capabilities relate to facilitating intra-frequency communications between the UE after the addition and prior to a role switch of the target BS and the source BS or a release of the source BS; means for receiving, from the source BS, an RRC reconfiguration message after providing the information to the source BS, wherein the RRC reconfiguration message causes the UE to use a subset of the set of transition capabilities to facilitate the intra-frequency communications after the addition and prior to the role switch or the release; means for communicating, using the subset of the set of transition capabilities, with the target BS, prior to the role switch or the release; and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
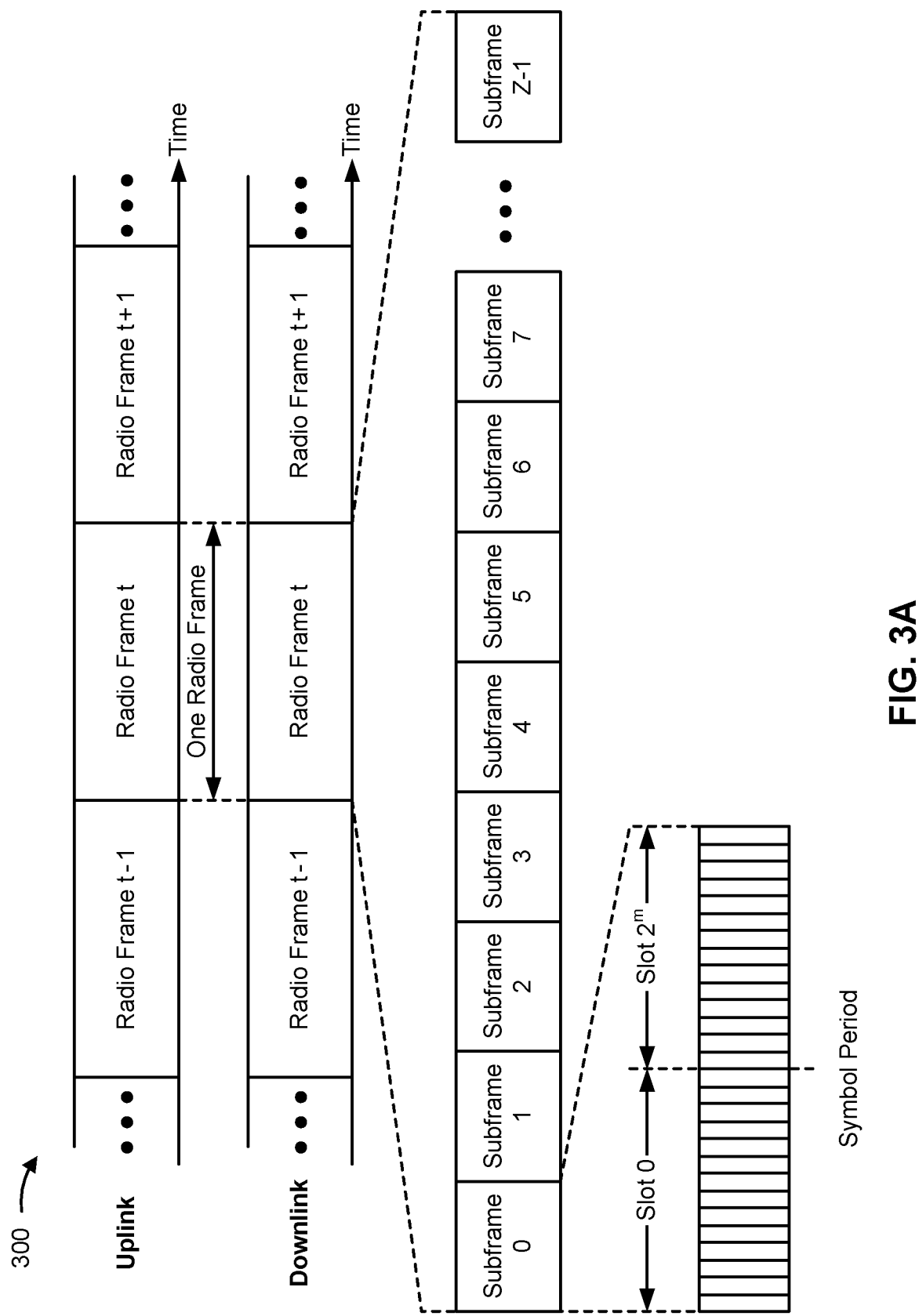
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
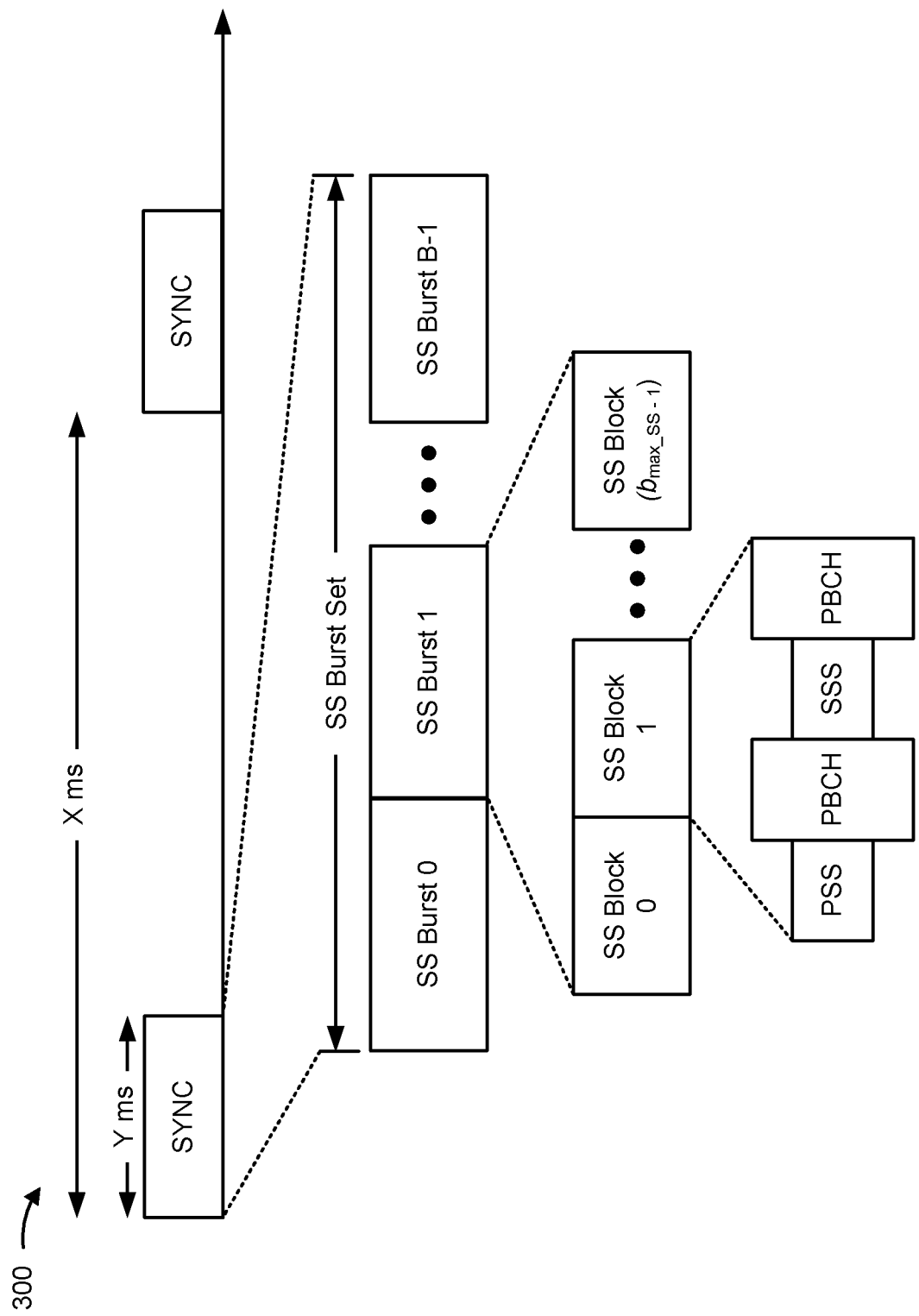
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block (bmax SS−1), where bmax SS−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
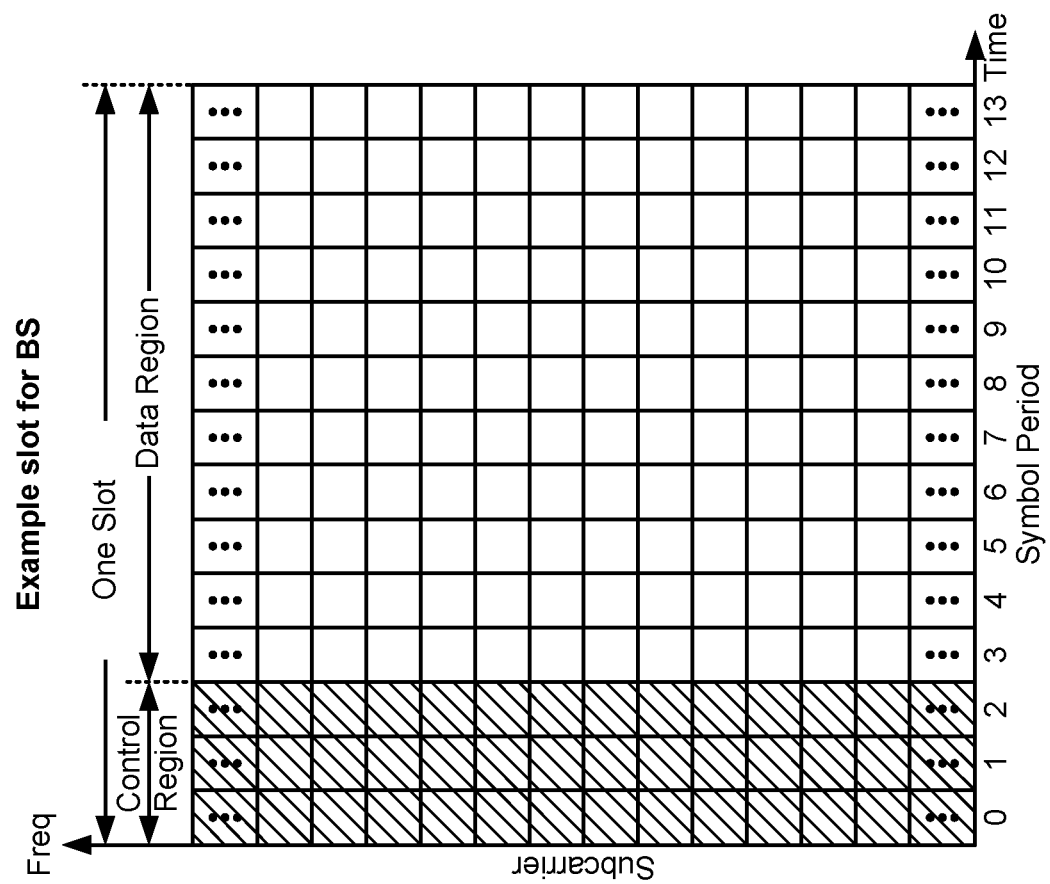
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
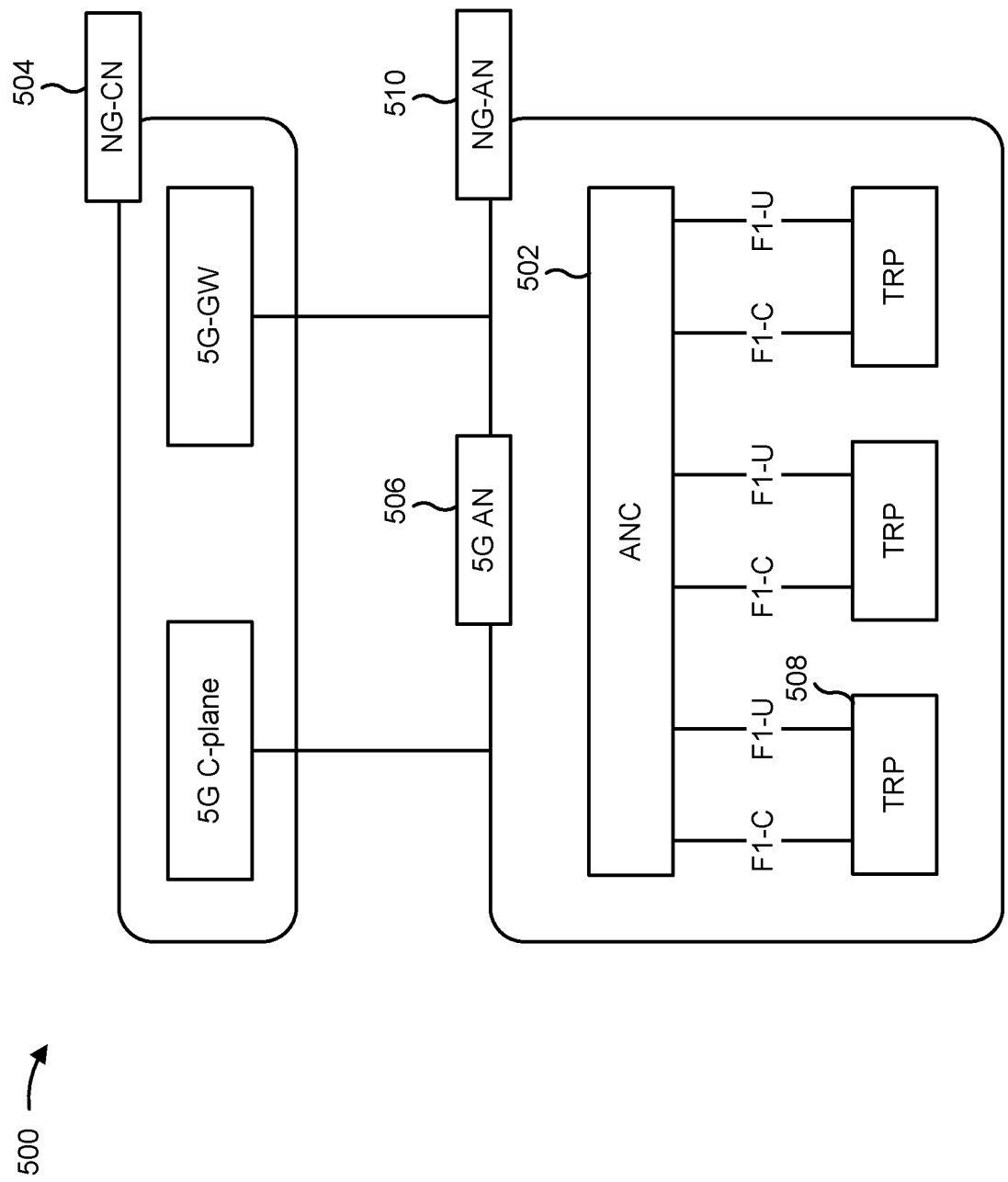
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As noted above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. The next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
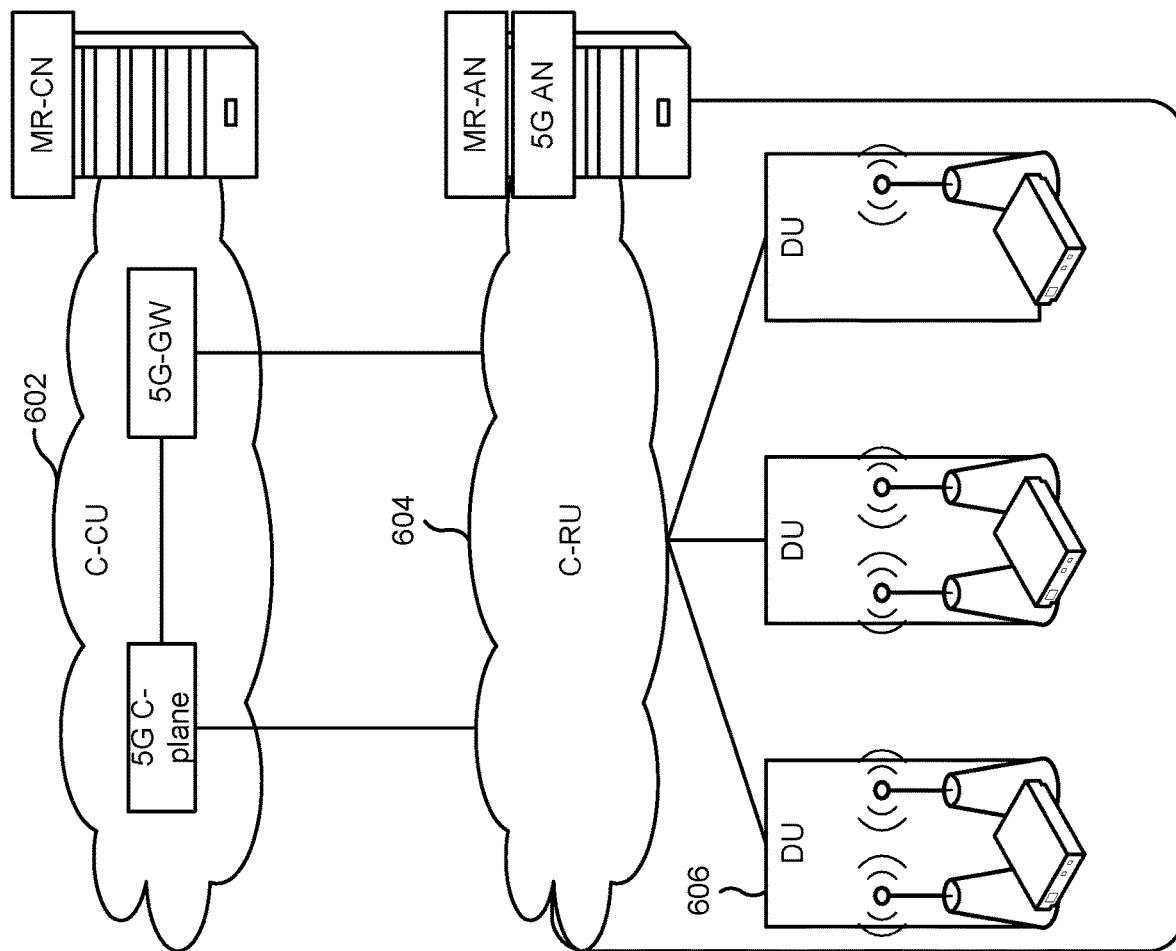
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

Figure 7:
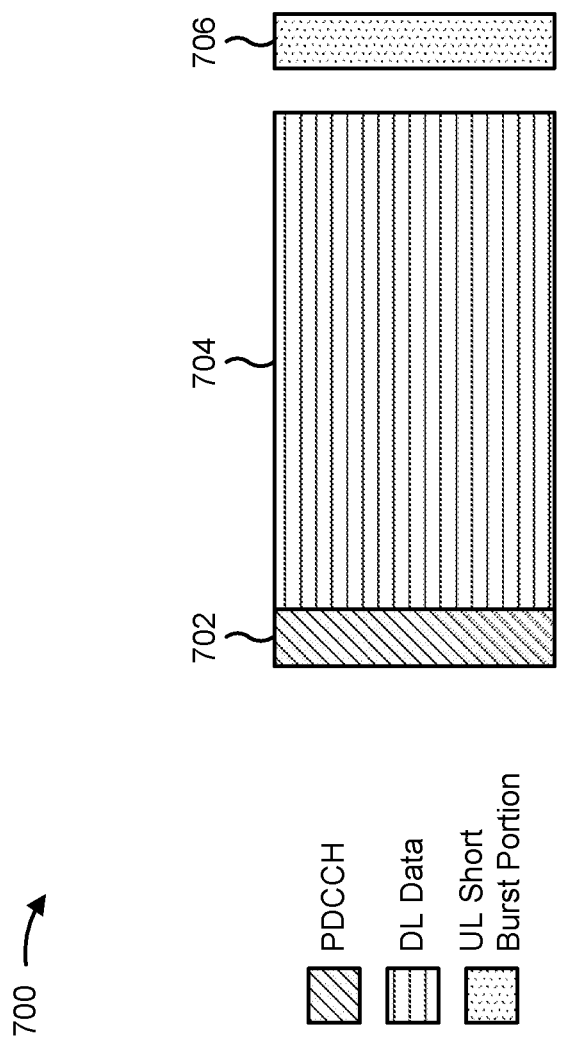
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PD SCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a physical uplink control channel (PUCCH) ACK, a physical uplink shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 7 is provided as an example. Other examples may differ from what is described with regard to FIG. 7.

Figure 8:
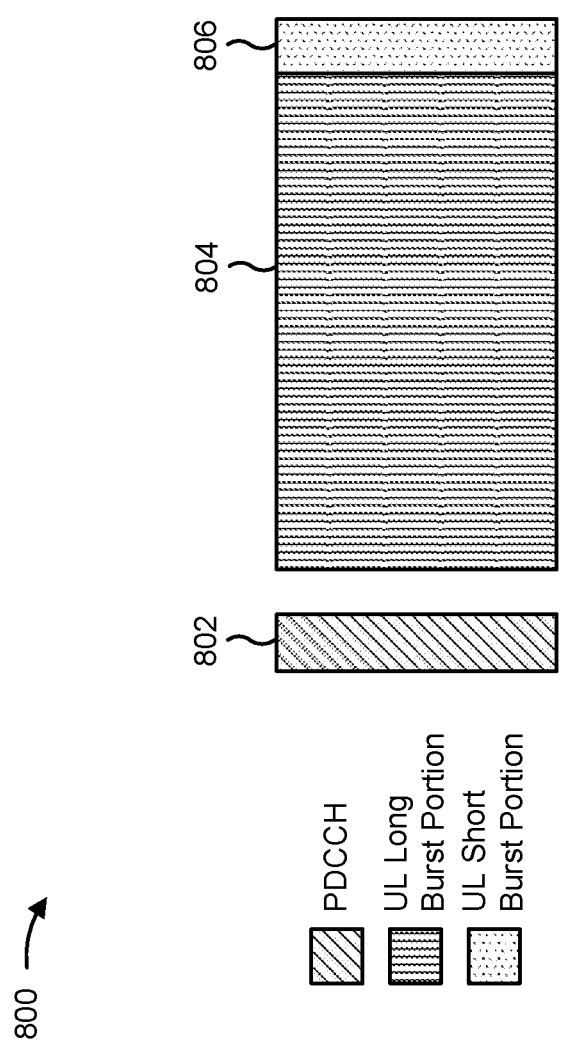
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided as an example. Other examples may differ from what is described with regard to FIG. 8.

For UE mobility in LTE and NR, reducing interruptions to communications as the UE transitions from communicating with one BS to another BS is important for reducing latency, for maintaining reliability of communications, and/or the like. One possible way for the UE to transition from one BS to another BS while minimizing interruptions is for the UE to simultaneously communicate with both of the B Ss. During this transition, the UE may not be capable of using the UE's full transmission and reception capabilities, due to configurations of the two BSs, due to configurations of the UE, and/or the like.

Some techniques and apparatuses described herein provide for coordination of use of UE capabilities during a transition of the UE from one BS to another BS. For example, the UE may provide, to a source BS, information that identifies a set of transition capabilities that the UE can use to communicate with both the source BS and a target BS. The source BS may then select the target BS based on the set of transition capabilities, so that the UE can simultaneously communicate with the source BS and the target BS during transition of the UE. This improves communications of the UE by reducing or eliminating interruptions to the communications during transition of the UE. In addition, this reduces or eliminates latency in communications that would otherwise be associated with transitioning the UE from the source BS to the target BS.

Figure 9:
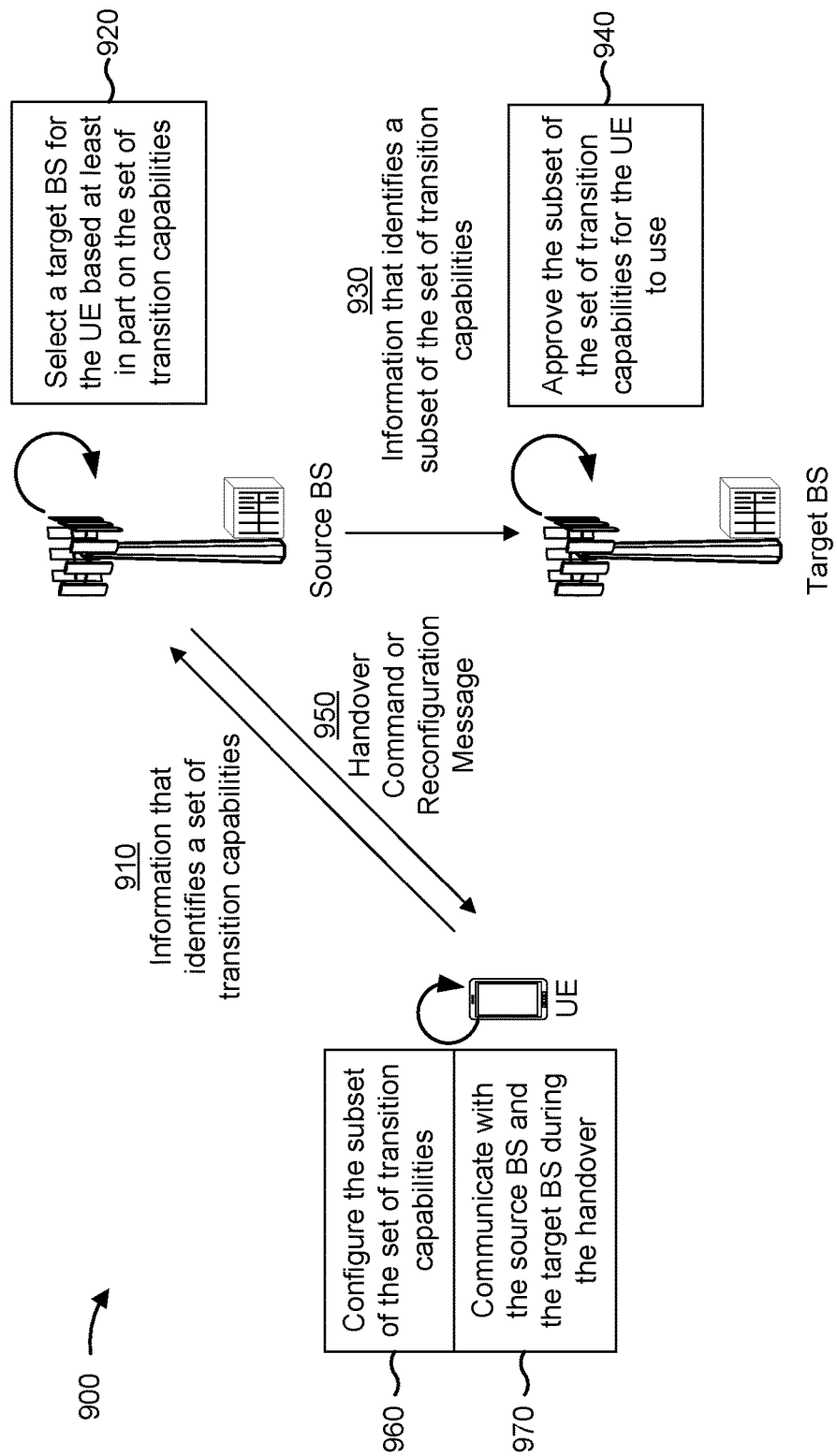
FIG. 9 is a diagram illustrating an example of user equipment (UE) capability-based transition, in accordance with various aspects of the present disclosure.

FIG. 9 is a diagram illustrating an example 900 of UE capability-based transition, in accordance with various aspects of the present disclosure. As shown in FIG. 9, example 900 includes a UE (e.g., UE 120), a source BS (e.g., a source BS 110), and a target BS (e.g., a target BS 110).

As shown in FIG. 9, and by reference number 910, the UE may provide, to a source BS, information that identifies a set of transition capabilities of the UE. For example, the UE may provide the information prior to a handover of the UE from the source BS to a target BS.

The set of transition capabilities may facilitate communication between the UE and the target BS prior to release of the source BS during the handover. For example, the UE may use the set of capabilities to communicate with both the source BS and the target BS between receiving a handover command (e.g., for a non-conditional handover) or reconfiguration message (e.g., for a conditional handover) from the source BS and release of the source BS. The set of transition capabilities may indicate the UE's full capability (e.g., the UE's full transmission capabilities) and may include a simultaneous reception capability (e.g., a capability to receive communications from both the source BS and the target BS at a same time), a simultaneous transmission capability (e.g., a capability to provide communications to the source BS and the target BS at a same time, different combinations of physical channels from the source BS and the target BS, and/or the like), a time domain multiplexing (TDM) reception capability (e.g., TDM patterns that the UE is capable of using to receive communications from both the source BS and the target BS in a slot, switching delays needed for the UE to switch between the source BS and the target BS for receiving communications, and/or the like), a time domain multiplexing transmission capability (e.g., TDM patterns that the UE is capable of using to receive communications from both the source BS and the target BS in a slot, switching delays needed for the UE to switch between the source BS and the target BS for receiving communications, and/or the like), a carrier aggregation capability (e.g., a capability of the UE to use multiple carriers across the source BS and the target BS), a data rate capability (e.g., whether the UE supports MIMO communications, and/or the like), and/or the like. With regard to the simultaneous reception capability and the simultaneous transmission capability, the simultaneous transmission capability is related to simultaneously transmitting multiple communications associated with a same physical channel (e.g., two PUSCH communications) or associated with different physical channels (e.g., a PUSCH communication and a PUCCH communication), and the simultaneous reception capability is related to simultaneously receiving multiple communications associated with a same physical channel or associated with different physical channels.

The set of transition capabilities may be UE-specific (e.g., one set of capabilities for the UE), band-specific (e.g., one set of capabilities per band), band-combination-specific (e.g., one set of capabilities for a combination of bands associated with the source BS and the target BS), or band-specific per band-combination (e.g., one set of capabilities per band per band-combination), and/or the like. The set of transition capabilities may be specific to a portion of the handover. For example, the UE may use a first subset of transition capabilities until the UE initiates access to the target BS, and may use a second subset of transition capabilities from initiating access to the target BS until release of the source BS. As other examples, the UE may use different subsets prior to starting a RACH attempt and after starting the RACH attempt, prior to RACH completion and after RACH completion, and/or the like. This facilitates customization and flexibility in configuring the UE at different times during the handover based on different computing resource needs at the different times, thereby reducing or eliminating situations that can negatively impact operations of the UE, such as where the UE has idle computing resources or where the UE is experiencing an overconsumption of computing resources.

The UE may provide the information that identifies the set of transition capabilities to the source BS (e.g., in association with connecting to the source BS). Additionally, or alternatively, the source BS may request the information that identifies the set of transition capabilities from the UE (e.g., in association with the UE connecting to the source BS). In some aspects, rather than the UE providing the information that identifies the set of transition capabilities, the source BS may perform a lookup of the set of transition capabilities (or may request that another device perform the lookup) based at least in part on an identifier of the UE, hardware or software configurations of the UE, and/or the like.

As shown by reference number 920, the source BS may select a target BS for the UE based at least in part on the set of transition capabilities. For example, the source BS may select the target BS based at least in part on whether a target BS has the capability to facilitate transition of the UE in the manner described herein, traffic associated with the UE (e.g., whether the traffic is eMBB traffic, URLLC traffic, and/or the like), and/or the like. As a specific example, if the UE is capable of using a particular TDM pattern to facilitate communications between the source BS and a target BS during a handover, then the source BS may select a target BS that is capable of using the same TDM pattern.

As shown by reference number 930, the source BS may provide, to the target BS, information that identifies a subset of the set of transition capabilities. For example, the source BS may provide the information that identifies the subset of the set of transition capabilities after selecting the target BS. The subset may include one or more of the set of transition capabilities that the source BS determines the target BS can use. For example, if the UE is capable of using simultaneous reception and transmission as well as various TDM patterns, but the target BS is only capable of using one particular TDM pattern, the source BS may select the particular TDM pattern that matches the capability of the target BS and may provide this information to the target BS.

As shown by reference number 940, the target BS may approve the subset of the set of transition capabilities for the UE to use. For example, after the source BS has selected the target BS, the target BS may approve the subset of the set of transition capabilities after receiving the information that identifies the subset. The target BS may approve the subset based at least in part on determining that the subset of the set of transition capabilities matches capabilities of the target BS.

The target BS may provide, to the source BS, a handover command or reconfiguration message for a handover of the UE from the source BS to the target BS. For example, the target BS may provide the handover command or reconfiguration message to the source BS after approving the subset of the set of transition capabilities.

As shown by reference number 950, the source BS may provide, to the UE, a handover command or reconfiguration message. For example, the source BS may provide the handover command or reconfiguration message to the UE after receiving the handover command or reconfiguration message from the target BS. The handover command or reconfiguration message may cause the UE to use the subset of the set of transition capabilities during the handover to facilitate communication with the target BS prior to release of the source BS. For example, the handover command or reconfiguration message may identify a subset of the set of transition capabilities that the UE is to use during the handover to communicate with the source BS and the target BS during the handover. The handover command or reconfiguration message may be related to causing the UE to perform one or more actions related to the handover (e.g., to perform a RACH procedure with the target BS). In some aspects, the handover command or reconfiguration message may be related to causing a conditional handover. For example, the handover command or reconfiguration message may identify a set of target BSs and corresponding conditions that are to control when, and to which target BSs, the UE is to be handed over.

As shown by reference number 960, the UE may configure the subset of the set of transition capabilities. For example, the UE may configure the subset of the set of transition capabilities based at least in part on receiving the handover command or reconfiguration message. When configuring the subset of the set of transition capabilities, the UE may activate the subset, may deactivate remaining transition capabilities not included in the subset, and/or the like.

As shown by reference number 970, the UE may communicate with the source BS and the target BS during the handover. For example, the UE may communicate with the source BS and the target BS after receiving the handover command or reconfiguration message and prior to release of the source BS (e.g., while maintaining a connection with the source BS).

The UE may attempt to access the target BS in association with the handover. For example, the UE may attempt to access the target BS after receiving the handover command or reconfiguration message and prior to release of the source BS. Continuing with the previous example, the UE may initiate a RACH procedure with the target BS after receiving the handover command or reconfiguration message. Depending on whether different subsets of capabilities need to be used at different times during the handover, the UE may stop using a first subset of capabilities and may start using a second subset of capabilities (e.g., after configuring the second subset of capabilities). For example, the UE may stop using the first subset of transition capabilities based at least in part on initiating access to the target BS, completing access to the target BS, and/or the like.

The UE may release the source BS. For example, the UE may release the source BS after successfully accessing the target BS and establishing a connection with the target BS. After releasing the source BS, the UE may stop using the subset of the set of transition capabilities and may resume normal use of capabilities of the UE. If attempting access to the target BS fails, then the UE may maintain the connection with the source BS. Because techniques and apparatuses described herein provide for maintaining of the connection to the source BS during handover to the target BS, interruptions to communications of the UE are reduced or eliminated, thereby improving operations of the UE, reducing or eliminating latency that would otherwise occur as a result of a failed access attempt, and/or the like.

Although FIG. 9 is described in the context of a handover and handover commands or reconfiguration messages, one or more aspects described above are applicable to NR secondary node (SN) procedures. In this context, the source BS may be operating as a master node (MN) connected to the UE and the UE may provide information that identifies a set of transition capabilities to the source BS, in a manner similar to that described above. A subset of the set of transition capabilities of the UE may be selected in a manner similar to that described above (e.g., the source BS and a target BS may communicate with each other to select the subset). After the subset has been selected, the UE, the source BS, and the target BS communicate with each other to add the target BS as an SN to the UE. For example, the UE may receive, from the source BS, an RRC reconfiguration message (rather than a handover command or reconfiguration message). The RRC reconfiguration message may be associated with causing the target BS to be added to the UE as the SN, with causing the UE to use the subset of the set of transition capabilities, and/or the like.

After the target BS is added as the SN, the UE, the source BS, and the target BS may communicate to perform a role switch of the source BS and the target BS. In this case, the target BS becomes the MN and the source BS becomes the SN. After addition of the target BS, and during the role switch, the UE may communicate with the target BS using the subset of the set of transition capabilities while maintaining a connection to the source BS. For example, these communications may be intra-frequency communications (e.g., TDD communications) with both the source BS and the target BS. The UE may release the source BS after the role switch.

As indicated above, FIG. 9 is provided as an example. Other examples may differ from what is described with respect to FIG. 9.

Figure 10:
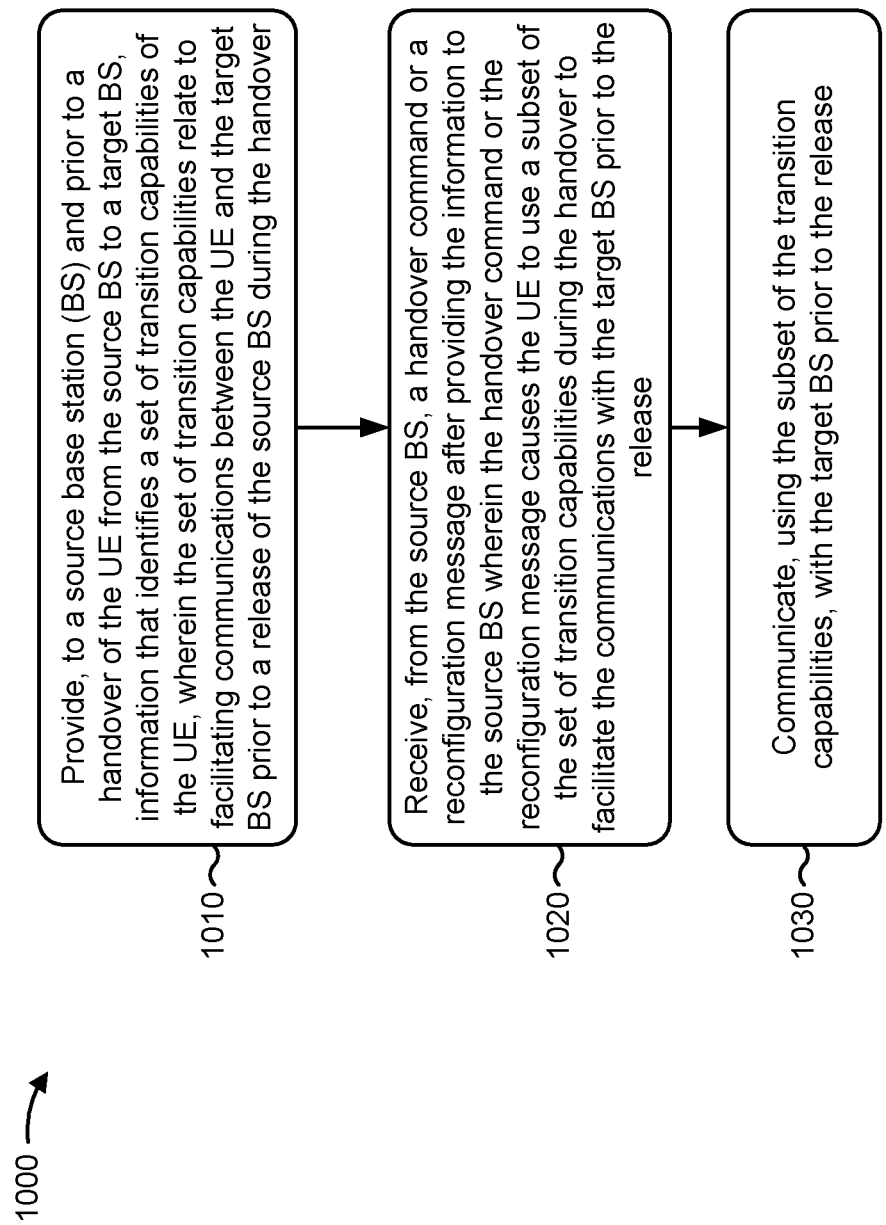
FIG. 10 is a diagram illustrating an example process performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with UE capability-based transition.

As shown in FIG. 10, in some aspects, process 1000 may include providing, to a source base station (BS) and prior to a handover of the UE from the source BS to a target BS, information that identifies a set of transition capabilities of the UE, wherein the set of transition capabilities relate to facilitating communications between the UE and the target BS prior to a release of the source BS during the handover (block 1010). For example, the UE (e.g., using controller/processor 280, transmit processor 264, TX MIMO processor 266, MOD 254, antenna 252, and/or the like) may provide, to a source BS and prior to a handover of the UE from the source BS to a target BS, information that identifies a set of transition capabilities of the UE, as described above. In some aspects, the set of transition capabilities relate to facilitating communications between the UE and the target BS prior to a release of the source BS during the handover.

As further shown in FIG. 10, in some aspects, process 1000 may include receiving, from the source BS, a handover command or reconfiguration message after providing the information to the source BS wherein the handover command or reconfiguration message causes the UE to use a subset of the set of transition capabilities during the handover to facilitate the communications with the target BS prior to the release (block 1020). For example, the UE (e.g., using antenna 252, DEMOD 254, MIMO detector 256, receive processor 258, controller/processor 280, and/or the like) may receive, from the source BS, a handover command or reconfiguration message after providing the information to the source BS, as described above. In some aspects, the handover command or reconfiguration message causes the UE to use a subset of the set of transition capabilities during the handover to facilitate the communications with the target BS prior to the release.

As further shown in FIG. 10, in some aspects, process 1000 may include communicating, using the subset of the transition capabilities, with the target BS prior to the release (block 1030). For example, the UE (e.g., using antenna 252, DEMOD 254, MIMO detector 256, receive processor 258, transmit processor 264, TX MIMO processor 266, MOD 254, controller/processor 280, and/or the like) may communicate, using the subset of the transition capabilities, with the target BS prior to the release, as described above.

Process 1000 may include additional aspects, such as any single implementation or any combination of aspects described below and/or in connection with one or more other processes described elsewhere herein.

In a first aspect, the set of transition capabilities indicates a full UE capability of the UE and includes at least one of a simultaneous reception capability, a simultaneous transmission capability, a time domain multiplexing reception capability, a time domain multiplexing transmission capability, a carrier aggregation capability, or a data rate capability. In a second aspect, in combination with the first aspect, the simultaneous reception capability is related to simultaneously receiving multiple communications associated with a same physical channel or associated with different physical channels, and the simultaneous transmission capability is related to simultaneously transmitting multiple communications associated with a same physical channel or associated with different physical channels. In a third aspect, alone or in combination with any one or more of the first through third aspects, the set of transition capabilities are UE-specific, band-specific, band-combination-specific, or band-specific per band-combination.

In a fourth aspect, alone or in combination with any one or more of the first and third aspects, the set of transition capabilities are specific to a portion of the handover, and another subset of the set of transition capabilities are specific to another portion of the handover. In a fifth aspect, alone or in combination with any one or more of the first through fourth aspects, the target BS is selected by the source BS based at least in part on the set of transition capabilities.

In a sixth aspect, in combination with the fifth aspect, the subset of the set of transition capabilities are to be approved by the target BS after the target BS has been selected. In a seventh aspect, alone or in combination with any one or more of the first through sixth aspects, the handover command or reconfiguration message for the handover is provided by the target BS to the UE via the source BS.

In an eighth aspect, alone or in combination with any one or more of the first through seventh aspects, the handover command or reconfiguration message is related to causing a conditional handover as the handover. In a ninth aspect, alone or in combination with any one or more of the first through eighth aspects, the UE may configure the subset of the set of transition capabilities based at least in part on receiving the handover command or reconfiguration message from the source BS.

In a tenth aspect, alone or in combination with any one or more of the first through ninth aspects, the UE may attempt, after receiving the handover command or reconfiguration message, to access the target BS in association with the handover, and may configure the subset of the set of transition capabilities in association with attempting to access the target BS. In an eleventh aspect, alone or in combination with any one or more of the first through tenth aspects, the UE may stop, based at least in part on receiving the handover command or reconfiguration message, use of another subset of the set of transition capabilities based at least in part on attempting access to the target BS, and may configure, based at least in part on receiving the handover command or reconfiguration message, the subset of the set of transition capabilities based at least in part on stopping use of the other subset of the set of transition capabilities.

In a twelfth aspect, alone or in combination with any one or more of the first through eleventh aspects, the UE may release, after receiving the handover command or reconfiguration message, the source BS, and may stop, based at least in part on releasing the source BS, use of the subset of the set of transition capabilities. In a thirteenth aspect, alone or in combination with any one or more of the first through twelfth aspects, the UE may receive, from the source BS, a request for the information prior to providing the information to the source BS.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
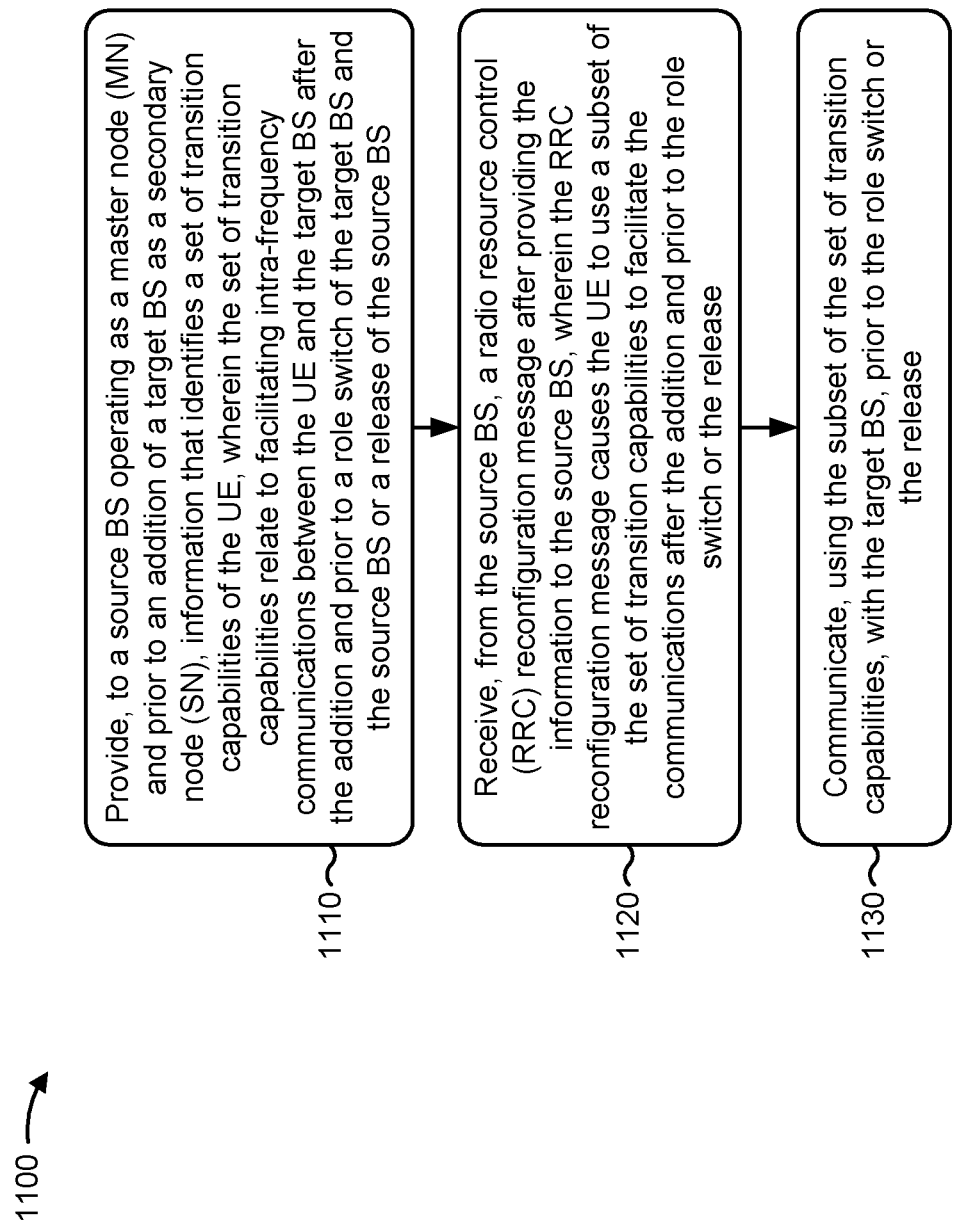
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120) and/or the like) performs operations associated with UE capability-based transition.

As shown in FIG. 11, in some aspects, process 1100 may include providing, to a source BS operating as a master node (MN) and prior to an addition of a target BS as a secondary node (SN), information that identifies a set of transition capabilities of the UE, wherein the set of transition capabilities relate to facilitating intra-frequency communications between the UE and the target BS after the addition and prior to a role switch of the target BS and the source BS or a release of the source BS (block 1110). For example, the UE (e.g., using controller/processor 280, transmit processor 264, TX MIMO processor 266, MOD 254, antenna 252, and/or the like) may provide, to a source BS operating as an MN and prior to an addition of a target BS as an SN, information that identifies a set of transition capabilities of the UE, as described above. In some aspects, the set of transition capabilities relate to facilitating intra-frequency communications between the UE and the target BS after the addition and prior to a role switch of the target BS and the source BS or a release of the source BS.

As further shown in FIG. 11, in some aspects, process 1100 may include receiving, from the source BS, a radio resource control (RRC) reconfiguration message after providing the information to the source BS, wherein the RRC reconfiguration message causes the UE to use a subset of the set of transition capabilities to facilitate the communications after the addition and prior to the role switch or the release (block 1120). For example, the UE (e.g., using antenna 252, DEMOD 254, MIMO detector 256, receive processor 258, controller/processor 280, and/or the like) may receive, from the source BS, an RRC reconfiguration message after providing the information to the source BS, as described above. In some aspects, the RRC reconfiguration message causes the UE to use a subset of the set of transition capabilities to facilitate the communications after the addition and prior to the role switch or the release.

As further shown in FIG. 11, in some aspects, process 1100 may include communicating, using the subset of the set of transition capabilities, with the target BS, prior to the role switch or the release (block 1130). For example, the UE (e.g., using antenna 252, DEMOD 254, MIMO detector 256, receive processor 258, transmit processor 264, TX MIMO processor 266, MOD 254, controller/processor 280, and/or the like) may communicate, using the subset of the set of transition capabilities, with the target B S, prior to the role switch or the release, as described above.

Process 1100 may include additional aspects, such as any single implementation or any combination of aspects described below and/or in connection with one or more other processes described elsewhere herein.

In a first aspect, the set of transition capabilities indicates a full UE capability of the UE and includes at least one of a simultaneous reception capability, a simultaneous transmission capability, a time domain multiplexing reception capability, a time domain multiplexing transmission capability, a carrier aggregation capability, or a data rate capability. In a second aspect, in combination with the first aspect, the simultaneous reception capability is related to simultaneously receiving multiple communications associated with a same physical channel or associated with different physical channels, and the simultaneous transmission capability is related to simultaneously transmitting multiple communications associated with a same physical channel or associated with different physical channels. In a third aspect, alone or in combination with any one or more of the first and second aspects, the set of transition capabilities are UE-specific, band-specific, band-combination-specific, or band-specific per band-combination.

In a fourth aspect, alone or in combination with any one or more of the first through third aspects, the set of transition capabilities are specific to a portion of the addition, and another subset of the set of transition capabilities are specific to another portion of the addition. In a fifth aspect, alone or in combination with any one or more of the first through fourth aspects, the target BS is selected by the source BS based at least in part on the set of transition capabilities. In a sixth aspect, in combination with the fifth aspect, the subset of the set of transition capabilities are to be approved by the target BS after the target BS has been selected.

In a seventh aspect, alone or in combination with any one or more of the first through sixth aspects, the RRC reconfiguration message for the addition is provided by the target BS to the UE via the source BS. In an eighth aspect, alone or in combination with any one or more of the first through seventh aspects, the RRC reconfiguration message is related to causing a conditional addition as the addition.

In a ninth aspect, alone or in combination with any one or more of the first through eighth aspects, the UE may configure the subset of the set of transition capabilities based at least in part on receiving the RRC reconfiguration message from the source BS. In a tenth aspect, alone or in combination with any one or more of the first through ninth aspects, the UE may attempt, after receiving the RRC reconfiguration message, to access the target BS in association with the addition, and may configure the subset of the set of transition capabilities in association with attempting to access the target BS.

In an eleventh aspect, alone or in combination with any one or more of the first through tenth aspects, the UE may stop, based at least in part on receiving the RRC reconfiguration message, use of another subset of the set of transition capabilities based at least in part on attempting access to the target BS, and may configure, based at least in part on receiving the RRC connection reconfiguration message, the subset of the set of transition capabilities based at least in part on stopping use of the other subset of the set of transition capabilities. In a twelfth aspect, alone or in combination with any one or more of the first through eleventh aspects, the target BS is added as the SN for dual connectivity with the source BS.

In a thirteenth aspect, in combination with the twelfth aspect, the target BS is switched, in association with the role switch, to operating as the MN, and the source BS is switched, in association with the role switch, to operating as the SN based at least in part on the target BS having been added as the SN. In a fourteenth aspect, in combination with the thirteenth aspect, the UE may release, after receiving the RRC reconfiguration message, the source BS, and may stop, based at least in part on releasing the source BS, use of the subset of the set of transition capabilities. In a fifteenth aspect, alone or in combination with any one or more of the first through fourteenth aspects, the UE may receive, from the source BS, a request for the information prior to providing the information to the source BS.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    providing, by the UE, to a source base station (BS), and prior to a handover of the UE from the source BS to a target BS, information that identifies a set of transition capabilities of the UE,
        wherein the set of transition capabilities relate to facilitating communications between the UE and the target BS prior to a release of the source BS during the handover;
    receiving, by the UE and from the source BS, a handover command or reconfiguration message after providing the information to the source BS,
        wherein the handover command or reconfiguration message causes the UE to use a subset of the set of transition capabilities during the handover to facilitate the communications with the target BS prior to the release; and
    communicating, using the subset of the set of transition capabilities, with the target BS prior to the release.

2. The method of claim 1, wherein the set of transition capabilities indicates a full UE capability of the UE and includes at least one of:
    a simultaneous reception capability,
    a simultaneous transmission capability,
    a time domain multiplexing reception capability,
    a time domain multiplexing transmission capability,
    a carrier aggregation capability, or
    a data rate capability.

3. The method of claim 2, wherein the simultaneous reception capability is related to simultaneously receiving multiple communications associated with a same physical channel or associated with different physical channels, and
    wherein the simultaneous transmission capability is related to simultaneously transmitting multiple communications associated with a same physical channel or associated with different physical channels.

4. The method of claim 1, wherein the set of transition capabilities are UE-specific, band-specific, band-combination-specific, or band-specific per band-combination.

5. The method of claim 1, wherein the set of transition capabilities are specific to a portion of the handover, and wherein another subset of the set of transition capabilities are specific to another portion of the handover.

6. The method of claim 1, wherein the target BS is selected by the source BS based at least in part on the set of transition capabilities.

7. The method of claim 6, wherein the subset of the set of transition capabilities are to be approved by the target BS after the target BS has been selected.

8. The method of claim 1, wherein the handover command or reconfiguration message for the handover is provided by the target BS to the UE via the source BS.

9. The method of claim 1, wherein the handover command or reconfiguration message is related to causing a conditional handover as the handover.

10. The method of claim 1, further comprising:
configuring the subset of the set of transition capabilities based at least in part on receiving the handover command or reconfiguration message from the source BS.

11. The method of claim 1, communicating with the target BS comprises:
attempting, after receiving the handover command or reconfiguration message, to access the target BS in association with the handover; and
configuring the subset of the set of transition capabilities in association with attempting to access the target BS.

12. The method of claim 1, further comprising:
stopping, based at least in part on receiving the handover command or reconfiguration message, use of another subset of the set of transition capabilities based at least in part on attempting access to the target BS; and
configuring, based at least in part on receiving the handover command or reconfiguration message, the subset of the set of transition capabilities based at least in part on stopping use of the other subset of the set of transition capabilities.

13. The method of claim 1, further comprising:
releasing, after receiving the handover command or reconfiguration message, the source BS; and
stopping, based at least in part on releasing the source BS, use of the subset of the set of transition capabilities.

14. The method of claim 1, further comprising:
receiving, from the source BS, a request for the information prior to providing the information to the source BS.

15. A method of wireless communication performed by a user equipment (UE), comprising:
providing, by the UE, to a source base station (BS) operating as a master node (MN), and prior to an addition of a target BS as a secondary node (SN), information that identifies a set of transition capabilities of the UE,
wherein the set of transition capabilities relate to facilitating intra-frequency communications between the UE and the target BS after the addition and prior to a role switch of the target BS and the source BS or a release of the source BS;
receiving, by the UE and from the source BS, a radio resource control (RRC) reconfiguration message after providing the information to the source BS,
wherein the RRC reconfiguration message causes the UE to use a subset of the set of transition capabilities to facilitate the intra-frequency communications after the addition and prior to the role switch or the release; and
communicating, using the subset of the set of transition capabilities, with the target BS, prior to the role switch or the release.

16. The method of claim 15, wherein the set of transition capabilities indicates a full UE capability of the UE and include at least one of:
a simultaneous reception capability,
a simultaneous transmission capability,
a time domain multiplexing reception capability,
a time domain multiplexing transmission capability,
a carrier aggregation capability, or
a data rate capability.

17. The method of claim 16, wherein the simultaneous reception capability is related to simultaneously receiving multiple communications associated with a same physical channel or associated with different physical channels, and
wherein the simultaneous transmission capability is related to simultaneously transmitting multiple communications associated with a same physical channel or associated with different physical channels.

18. The method of claim 15, wherein the set of transition capabilities are UE-specific, band-specific, band-combination-specific, or band-specific per band-combination.

19. The method of claim 15, wherein the set of transition capabilities are specific to a portion of the addition, and
wherein another subset of the set of transition capabilities are specific to another portion of the addition.

20. The method of claim 15, wherein the target BS is selected by the source BS based at least in part on the set of transition capabilities.

21. The method of claim 20, wherein the subset of the set of transition capabilities are to be approved by the target BS after the target BS has been selected.

22. The method of claim 15, wherein the RRC reconfiguration message for the addition is provided by the target BS to the UE via the source BS.

23. The method of any claim 15, wherein the RRC reconfiguration message is related to causing a conditional addition as the addition.

24. The method of claim 15, further comprising:
configuring the subset of the set of transition capabilities based at least in part on receiving the RRC reconfiguration message from the source BS.

25. The method of claim 15, wherein communicating with the target BS comprises:
attempting, after receiving the RRC reconfiguration message, to access the target BS in association with the addition; and
configuring the subset of the set of transition capabilities in association with attempting to access the target BS.

26. The method of claim 15, further comprising:
stopping, based at least in part on receiving the RRC reconfiguration message, use of another subset of the set of transition capabilities based at least in part on attempting access to the target BS; and
configuring, based at least in part on receiving the RRC reconfiguration message, the subset of the set of transition capabilities based at least in part on stopping use of the other subset of the set of transition capabilities.

27. The method of claim 15, wherein the target BS is added as the SN for dual connectivity with the source BS.

28. The method of claim 27, wherein the target BS is switched, in association with the role switch, to operating as the MN and the source BS is switched, in association with the role switch, to operating as the SN based at least in part on the target BS having been added as the SN.

29. The method of claim 28, further comprising:
releasing, after receiving the RRC reconfiguration message, the source BS; and stopping, based at least in part on releasing the source BS, use of the subset of the set of transition capabilities.

30. The method of claim 15, further comprising:
receiving, from the source BS, a request for the information prior to providing the information to the source BS.

31. A user equipment (UE) for wireless communication, comprising:
a memory; and
one or more processors operatively coupled to the memory, the memory and the one or more processors configured to:
provide, from the UE, to a source base station (BS), and prior to a handover of the UE from the source BS to a target BS, information that identifies a set of transition capabilities of the UE,
wherein the set of transition capabilities relate to facilitating communications between the UE and the target BS prior to a release of the source BS during the handover;
receive, by the UE and from the source BS, a handover command or reconfiguration message after providing the information to the source BS,
wherein the handover command or reconfiguration message causes the UE to use a subset of the set of transition capabilities during the handover to facilitate the communications with the target BS prior to the release; and
communicate, using the subset of the set of transition capabilities, with the target BS prior to the release.

32. A user equipment (UE) for wireless communication, comprising:
a memory; and
one or more processors operatively coupled to the memory, the memory and the one or more processors configured to:
provide, from the UE, to a source base station (BS) operating as a master node (MN), and prior to an addition of a target BS as a secondary node (SN), information that identifies a set of transition capabilities of the UE,
wherein the set of transition capabilities relate to facilitating intra-frequency communications between the UE after the addition and prior to a role switch of the target BS and the source BS or a release of the source BS;
receive, by the UE and from the source BS, a radio resource control (RRC) reconfiguration message after providing the information to the source BS,
wherein the RRC reconfiguration message causes the UE to use a subset of the set of transition capabilities to facilitate the intra-frequency communications after the addition and prior to the role switch or the release; and
communicate, using the subset of the set of transition capabilities, with the target BS prior to the role switch or the release.

33. A non-transitory computer-readable medium storing one or more instructions for wireless communication, the one or more instructions comprising:
one or more instructions that, when executed by one or more processors of a user equipment (UE), cause the one or more processors to:
provide, from the UE, to a source base station (BS), and prior to a handover of the UE from the source BS to a target BS, information that identifies a set of transition capabilities of the UE,
wherein the set of transition capabilities relate to facilitating communications between the UE and the target BS prior to a release of the source BS during the handover;
receive, by the UE and from the source BS, a handover command or reconfiguration message after providing the information to the source BS,
wherein the handover command or reconfiguration message causes the UE to use a subset of the set of transition capabilities during the handover to facilitate the communications with the target BS prior to the release; and
communicate, using the subset of the set of transition capabilities, with the target BS prior to the release.

34. A non-transitory computer-readable medium storing one or more instructions for wireless communication, the one or more instructions comprising:
one or more instructions that, when executed by one or more processors of a user equipment (UE), cause the one or more processors to:
provide, from the UE, to a source base station (BS) operating as a master node (MN), and prior to an addition of a target BS as a secondary node (SN), information that identifies a set of transition capabilities of the UE,
wherein the set of transition capabilities relate to facilitating intra-frequency communications between the UE after the addition and prior to a role switch of the target BS and the source BS or a release of the source BS;
receive, by the UE and from the source BS, a radio resource control (RRC) reconfiguration message after providing the information to the source BS,
wherein the RRC reconfiguration message causes the UE to use a subset of the set of transition capabilities to facilitate the intra-frequency communications after the addition and prior to the role switch or the release; and
communicate, using the subset of the set of transition capabilities, with the target BS, prior to the role switch or the release.

35. A first apparatus for wireless communication, comprising:
means for providing, from the first apparatus, to a second apparatus, and prior to a handover of the first apparatus from the second apparatus to a third apparatus, information that identifies a set of transition capabilities of the first apparatus,
wherein the set of transition capabilities relate to facilitating communications between the first apparatus and the third apparatus prior to a release of the second apparatus during the handover;
means for receiving, by the first apparatus and from the second apparatus, a handover command or reconfiguration message after providing the information to the second apparatus,
wherein the handover command or reconfiguration message causes the first apparatus to use a subset of the set of transition capabilities during the handover to facilitate the communications with the third apparatus prior to the release; and
means for communicating, using the subset of the set of transition capabilities, with the third apparatus prior to the release.

36. A first apparatus for wireless communication, comprising:

means for providing, from the first apparatus, to a second apparatus operating as a master node (MN), and prior to an addition of a third apparatus as a secondary node (SN), information that identifies a set of transition capabilities of the first apparatus,
  wherein the set of transition capabilities relate to facilitating intra-frequency communications between the first apparatus after the addition and prior to a role switch of the third apparatus and the second apparatus or a release of the second apparatus;
means for receiving, by the first apparatus and from the second apparatus, a radio resource control (RRC) reconfiguration message after providing the information to the second apparatus,
  wherein the RRC reconfiguration message causes the first apparatus to use a subset of the set of transition capabilities to facilitate the intra-frequency communications after the addition and prior to the role switch or the release; and
means for communicating, using the subset of the set of transition capabilities, with the third apparatus, prior to the role switch or the release.

* * * * *